Patented July 24, 1934

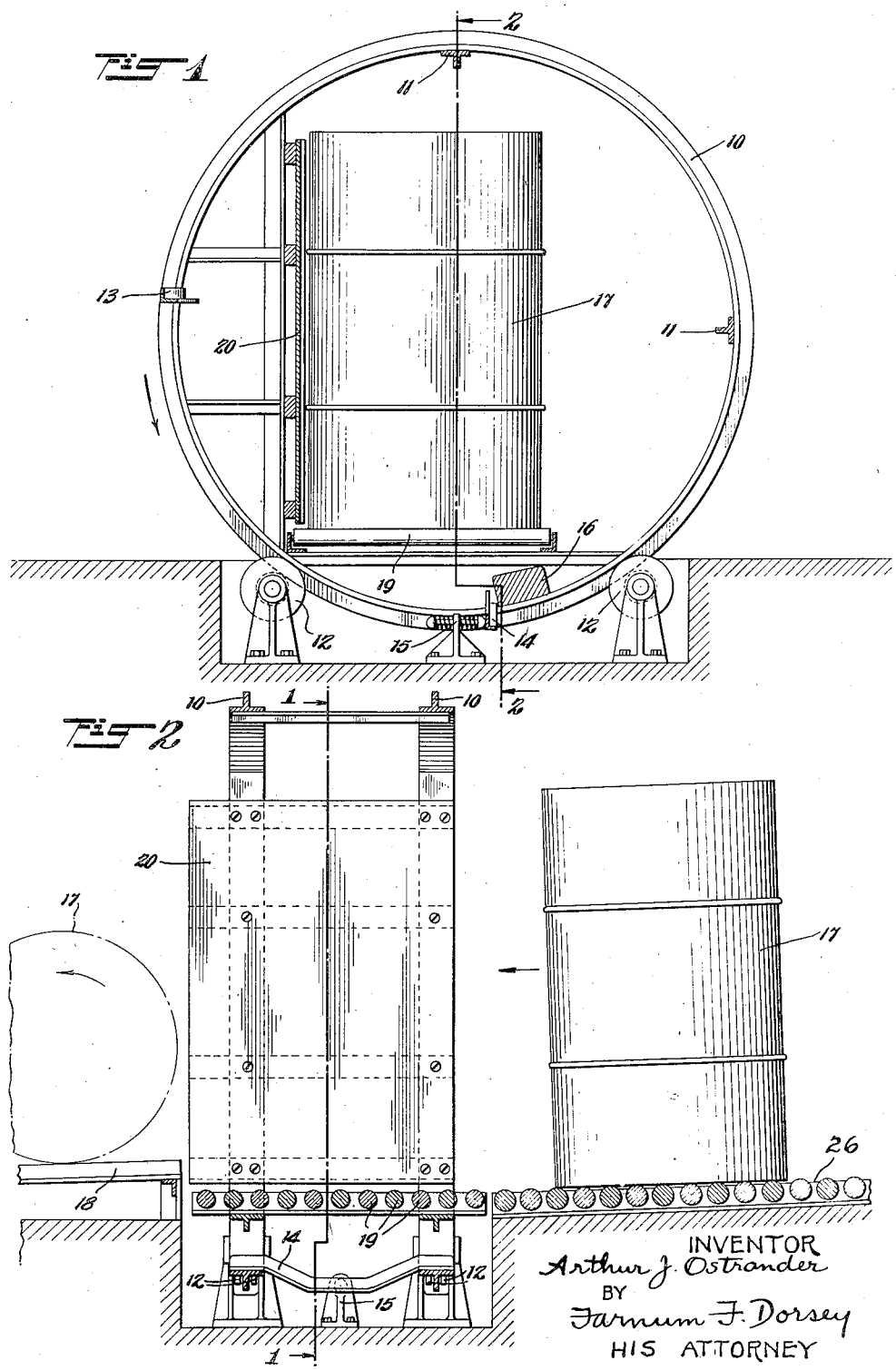

1,967,683

UNITED STATES PATENT OFFICE 1,967,683

TURNING MECHANISM

Arthur J. Ostrander, Woodbury, N. J., assignor to Vacuum Oil Company, Inc., New York, N. Y., a corporation of New York Application March 2, 1932, Serial No. 596,245

2 Claims. (Cl. 214—1)

This invention relates to mechanism for use in connection with conveyors of the roller type, such as are used in factories for the movement of barrels, boxes and the like.

In the use of a conveyor it is often desirable to change the position of the conveyed article on the conveyor—for example, to turn a barrel or drum from upright to horizontal position, or vice versa—or to transfer the article from one conveyor to another at a right angle with the first. The object of the present invention is to produce a simple mechanism for performing either or both of these functions, and particularly a mechanism which may be arranged to perform its functions automatically, under the effect of gravity.

The foregoing object is attained by a structure mounted to turn or rock, through an angle of substantially 90°, upon a fixed axis, and provided with two supports, or rollways, arranged at the same angle and adapted, respectively, to receive the conveyed article from one conveyor, and to discharge it upon a second conveyor arranged either in line, or at a right angle with the first.

Figure 3:
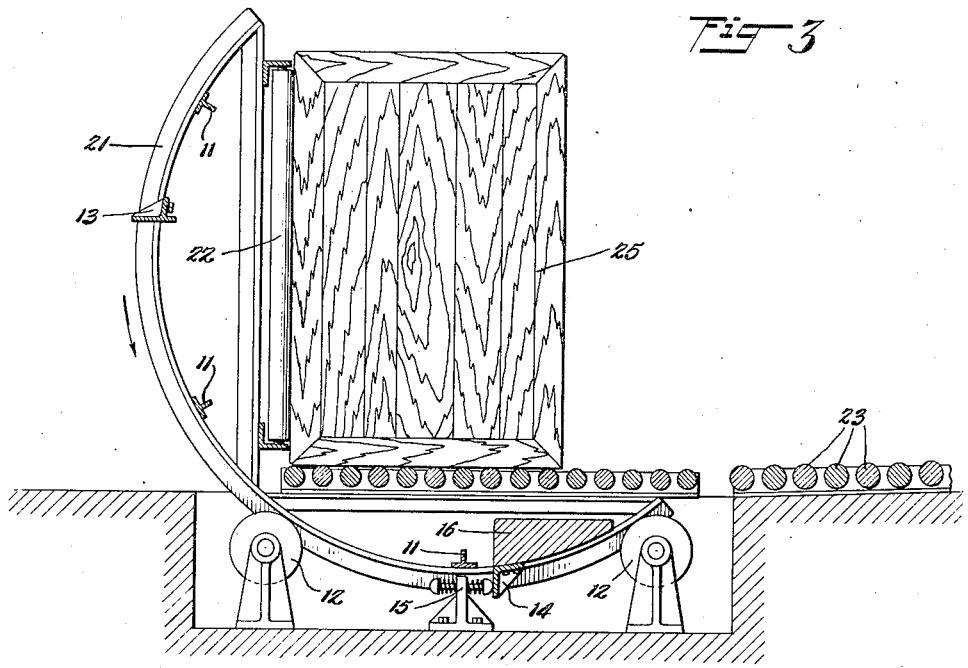
Figure 4:
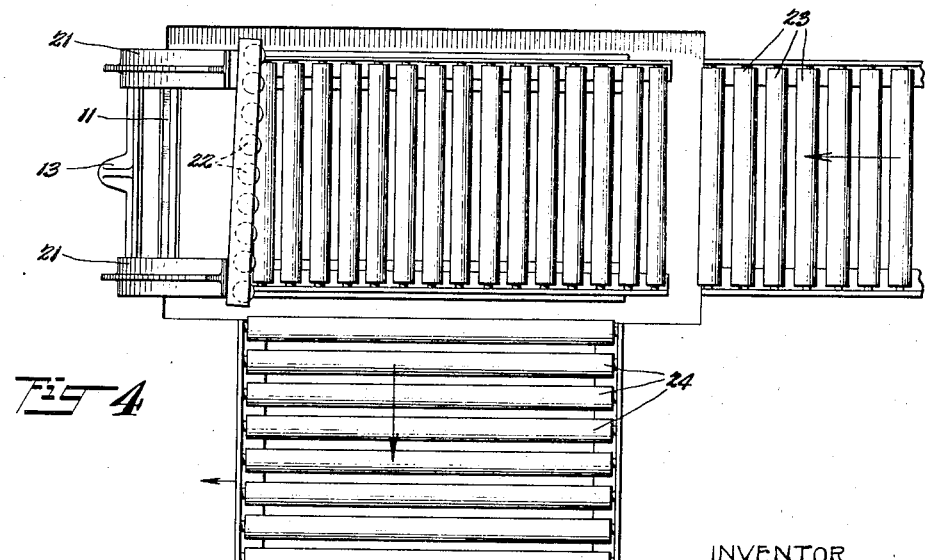

In the accompanying drawings, Fig. 1 is an elevation of turning mechanism embodying the present invention, shown in section on the line 1—1 in Fig. 2; and Fig. 2 is an elevation of the same, in section on the line 2—2 in Fig. 1, showing also adjacent portions of conveyors with which the mechanism is associated. Fig. 3 is an elevation of a modified form of the turning mechanism, shown in section on the line 3—3 in Fig. 4, and Fig. 4 is a plan view of the same, both figures showing portions of the conveyors with which the turning mechanism is associated.

The invention is illustrated, in Figs. 1 and 2, as embodied in a mechanism adapted to receive, from one conveyor, a drum moving in an upright position on the conveyor, to turn the drum into a horizontal position, and to discharge the drum, in horizontal position, on a second conveyor which is in substantial alignment with the first.

The turning mechanism comprises a frame, or cradle, having two circular members or rings 10 formed of iron. These rings are connected, in parallel position, by cross-members 11, 13 and 14. The frame is supported by four rollers 12 journalled on stationary bearings, the rollers being grooved to receive the outwardly projecting flanges of the rings. This arrangement permits the frame to rotate about the axis of the rings.

The cross-members 13 and 14 are located slightly more than 90° apart, and they have offset middle positions adapted to cooperation with a stationary stop 15 fixed beneath the frame. In this manner the turning of the frame upon the rollers is limited to approximately 90°. A weight 16, fixed transversely at the bottom of the frame, tends to rotate the frame into and hold it in the normal position shown in the drawings.

The turning mechanism is arranged with its axis of rotation approximately parallel with the length of a gravity conveyor 26, which is of the well-known type provided with a series of rollers upon which any flat object may roll and descend by gravity along the length of the conveyor. The conveyor is shown in the drawings as supporting a drum 17 in upright position. Extending from the opposite side of the turning mechanism is a second gravity conveyor. Since this conveyor receives the drums in horizontal position, it is not provided with rollers, as the drums are adapted, by their form, to roll upon simple rails. In each case the movement of the drum is the result of rolling along the length of the conveyor and, accordingly, the term "rollway" is used in the following description and the claims as indicating a conveyor or a surface upon which an article may roll, whether by reason of its own form or by reason of the provision of rollers on the conveyor.

The turning mechanism is provided with two supports, also in the form of rollways, which are arranged at a right angle, as shown in Fig. 1. The first support 19 is provided with rollers, so that the drum may move upon its surface while in an upright position. The second rollway 20 is a simple plate of sheet metal, which is slightly inclined to the axis of the frame, so that when this supoprt has been brought into position for operation, it slopes toward the conveyor 18.

In the operation of the mechanism shown in Figs. 1 and 2, a drum, descending the conveyor 26, is discharged directly upon the rollway 19, and is arrested in position thereon by engagement with the right-hand end of the second conveyor 18. As shown in Fig. 1, the parts are so arranged and proportioned that the center of gravity of the drum is offset slightly to one side of the axis of the turning mechanism. The result is that the weight 16 is overbalanced, and the frame therefore turns on the rollers 12 until arrested by engagement of the cross-bar 13 with the stop 15. When this occurs the rollway 20 is in its lowermost position, and the weight of the drum is transferred from the rollway 19 to the rollway 20. Owing to the inclination of the latter, the drum then rolls from the rollway 20 to the conveyor 18, upon which it may then roll away to some other point. As soon as the frame is relieved of the weight of the drum it returns to its original position, under the action of the weight 16.

It will be evident that, by obvious changes in the arrangement of the conveyors and the turning mechanism, the mechanism may be adapted to receive a drum rolling in a horizontal position and to turn it into vertical position for delivery to a second conveyor provided with rollers.

In the modified form shown in Figs. 3 and 4, the turning mechanism is adapted not only to turn the article moving upon the conveyors, but also to transfer the article between conveyors which extend in directions at a right angle with each other. Where this is to be done, it is necessary that the article either enter or leave the mechanism in a direction at a right angle to the axis of rotation of the mechanism. To facilitate this, the frame of the mechanism is shown as comprising two partially circular members 21, corresponding in function with the rings 10 of Fig. 1, and supported and controlled in the same manner. In this case the mechanism is shown as associated with conveyors, 23 and 24, each of which is provided with rollers so that they may handle an article such as a packing case 25. For the same reason, both of the rollways on the turning mechanism are provided with rollers.

A case descending the conveyor 23 moves into the position shown in Fig. 3, and causes the mechanism to turn until the case is supported by the rollway 22. This rollway is at that time in alignment with the second conveyor 24, upon which the case is then discharged, and the turning mechanism then returns to its original position.

It will be evident that the form of the mechanism shown in Figs. 3 and 4 may be used in connection with drums if suitable rollways to support the drums in a horizontal position are provided, as in Figs. 1 and 2.

While the automatic operation of the turning mechanism is the most convenient, it depends upon the size and form of the article conveyed with relation to the dimensions of the turning mechanism. If, in any case, the article to be handled is not of the size and form necessary to cause automatic operation, it will be evident that the mechanism may be manipulated at the proper time to cause it to perform its function of turning the article and transferring it from one conveyor to the other.

The invention claimed is:—

1. The combination, with two stationary conveyors of the rolling type, one at least of which comprises a series of rollers, of turning means interposed between said conveyors and comprising two parallel circularly curved members rigidly connected together, supporting rollers, for said members, arranged to support them rotatably in vertical planes, and two rollways supported on and between said members and arranged at a right angle with each other, one at least of said rollways comprising a series of parallel rollers, the adjacent edges of the rollways being located near the circularly curved members, and the conveyors being located, respectively, approximately at the same levels as the two rollways, respectively, when each rollway is turned to its lowest position by rotation of the circularly curved members.

2. The combination, with a conveyor, of turning means for receiving a container from the conveyor, turning it through an angle and discharging it in turned position, said means comprising a support partially rotatable through the required angle and carrying two rollways arranged at said angle with respect to each other, and means for arresting the support, at the extremes of its partial rotation, with one of its rollways, at one such extreme, in alignment with the conveyor, the turning means having a gravity bias to such position of alignment but being free to turn, under the weight of a container discharged thereon from the conveyor, to the other extreme position, to permit the container to roll from the turning means in its changed angular position.

ARTHUR J. OSTRANDER.